United States Patent [19]

Masterson

[11] 4,012,111
[45] Mar. 15, 1977

[54] MICROSCOPE OBJECT SLIDE POSITIONING SYSTEM

[75] Inventor: Earl E. Masterson, Minneapolis, Minn.

[73] Assignee: Honeywell Inc., Minneapolis, Minn.

[22] Filed: Aug. 25, 1975

[21] Appl. No.: 607,514

[52] U.S. Cl. .................................. 350/90; 350/86
[51] Int. Cl.² ................................... G02B 21/26
[58] Field of Search .................. 350/90, 86, 87

[56] References Cited
UNITED STATES PATENTS

| | | | |
|---|---|---|---|
| 2,003,387 | 6/1935 | Ott | 350/86 |
| 2,474,163 | 6/1949 | Riley | 350/90 |

*Primary Examiner*—David H. Rubin
*Attorney, Agent, or Firm*—Charles G. Mersereau

[57] ABSTRACT

A precision slide positioning system is disclosed which is particularly adapted for rigid and repeated positive location of a microscope object specimen slide relative to the movable stage of a scanning automated microscope such that a predetermined field of view based on perpendicular axis in the plane of the slide carrier tray can be automatically recalled after removal and subsequent replacement of the slide on the slide carrier plate. A pair of oppositely disposed, resiliently held slide retainers are provided which, operating on the slide, urge the slide against fixed alignment registration guides on the slide tray to retain the slide in a predetermined fixed parallel relation thereto. The slide is, in turn, held in adjustable fixed alignment with the traverse plate of the microscope stage. A release mechanism mechanically linked to both of the retainers is provided to withdraw the resiliently held retainers for ease of slide removal and insertion.

10 Claims, 7 Drawing Figures

MICROSCOPE OBJECT SLIDE POSITIONING SYSTEM

CROSS-REFERENCE TO RELATED APPLICATION

Reference is made to a co-pending application by Earl E. Masterson, the inventor in this application, Ser. No. 607,634, filed of even date and assigned to the same assignee as the present invention. That application is also concerned with a system for use in a scanning automated microscope. By that invention an automatically controllable microscope stage positioning system capable of repeatable, precise adjustment provided which includes a slide tray in which an object slide is mounted and which is adjustable in the plane of the tray and along the axis perpendicular to the plane of the tray to achieve automatic scanning and focusing to the automated microscope system. The positioning is achieved by using $x$, $y$ and $z$ axially adjustable lead screws which operate through nonrotating contacts to apply a force to move the stage in one direction along each of the $x$, $y$ and $z$ axes. Return springs which apply force vectors opposite that of the lead screws maintain the stage against the reversible lead screws at all times. Guide means are also provided to maintain the alignment of the slide tray in both the plane of the slide tray and along the axis perpendicular thereto. The drive is controlled by means of signals generated by the automatic microscope signal processing system.

The present invention, on the other hand, concerns the sytem for precision slide positioning of the slide itself on the slide tray rather than with the positioning of the slide tray and the microscope stage itself. It, therefore, is not directly concerned with the positioning of the microscope stage other than as an aid to the repeatable precision of that system.

BACKGROUND OF THE INVENTION

The present invention is related generally to the field of microscopic examination of objects including specimen slides containing biological specimens. One important example of this is the identifying and counting of the different types of white blood cells found in a smear of whole blood as well as other evaluations which require microscopic optical analysis of the blood. Generally, in the past the task of finding, identifying and counting white blood cells along with the performance of tests such as evaluating red blood cell morphology, platelet sufficiency, and other commonly utilized studies has been a tedious and time consuming manual task. Recently, much effort has been expended in an attempt to automate one or more phases of the examination of blood smears. An automated, computerized scanning system that enables an operator to perform leukocyte differential counts, red blood cell morphology studies, platelet sufficiency estimates and other required evaluations is illustrated and described in the copending application of Adkisson, et al., Ser. No. 607,741 filed of even date and assigned to the same assignee as the present invention.

In providing a complete automated, computerized scanning system such as that described in the above-referenced co-pending application of Adkisson, et al., precise locations on the specimen slide as originally positioned on the slide carrier plate or tray may be stored for further reference. Thus, if a medical technician or other skilled operator desires to note a particular field of view for future inspection by a pathologist or other interested party, the precise $x$ and $y$ coordinate positions in the plane of the field of view along the perpendicular $x$ and $y$ axes may be noted for future reference. In accordance with that system, when desired, that precise $x$—$y$ location may be recalled and utilized to actuate the microscope stage which, in turn, is driven thereto. If the object slide has been removed in the interim, however, it is necessary that the location of the object slide relative to the microscope stage location be precisely repeated upon subsequent replacement of the object slide on the slide tray such that the recalled field of view will correspond precisely to the same location on the slide itself. With the slide retaining means found in the prior art, the required precision, which may be within plus or minus 2.5 microns of the original position of the slide has not been possible.

The present invention, in particular, involves a system for precisely and positively positioning a microscope object slide in a repeatable manner relative to the movable stage of the microscope in an automated scanning microscope system.

SUMMARY OF THE INVENTION

By means of the present invention, the problems associated with repeatability and precision of the placement of a microscope object slide on a slide carrier tray relative to stage position are overcome by the provision of a unique slide positioning system which not only achieves the required repeatable precision but also is easily manipulated by the microscope operator or technician. The precision slide positioning system of the invention includes a slide carrier plate which is designed for mounting on the microscope stage and precisely aligned therewith and which is equipped with fixed alignment registration guides against which the slide can be precisely positioned. A pair of oppositely disposed, resiliently held slide retainers are provided which operate to urge the slide against the fixed alignment registration guides on the slide tray and also hold the slide down against the plate itself. Grooves may be provided in the plate to receive the ends of the slide. The resilient force producing members which operate on the slide retainers are normally springs operating to force the retainers in against edges of the slide and additional springs are provided to hold the retainers down against the slide carrier plate. A release mechanism is mechanically linked to both of the opposite retainer members such that finger pressure by the operator on a single point in the system will oppose the springs retaining the slide retainers against the slide allowing the slide to be readily withdrawn from or inserted in the positioning mechanism. The precision of the system is such that the slide can be repeatedly removed and replaced in the slide retaining system and the same field of view reproduced in the microscope optical system upon relocating of the microscope stage itself for the required position. This, of course, allows a medical technician or other skilled operator of a scanning automatic microscope or other such system to call specific fields of view which may represent unusual blood cells or other phenomena in a biological specimen to the attention of the pathologist at any time after the field of view has been once located and the coordinates noted. Thus, the slide may be removed, other tests or slides run before the slide is replaced in the slide tray and such location is recalled.

BRIEF DESCRIPTION OF THE DRAWINGS

In the drawings wherein like numerals are utilized to depict like parts throughout the same.

DESCRIPTION OF THE PREFERRED EMBODIMENT

Figure 1:
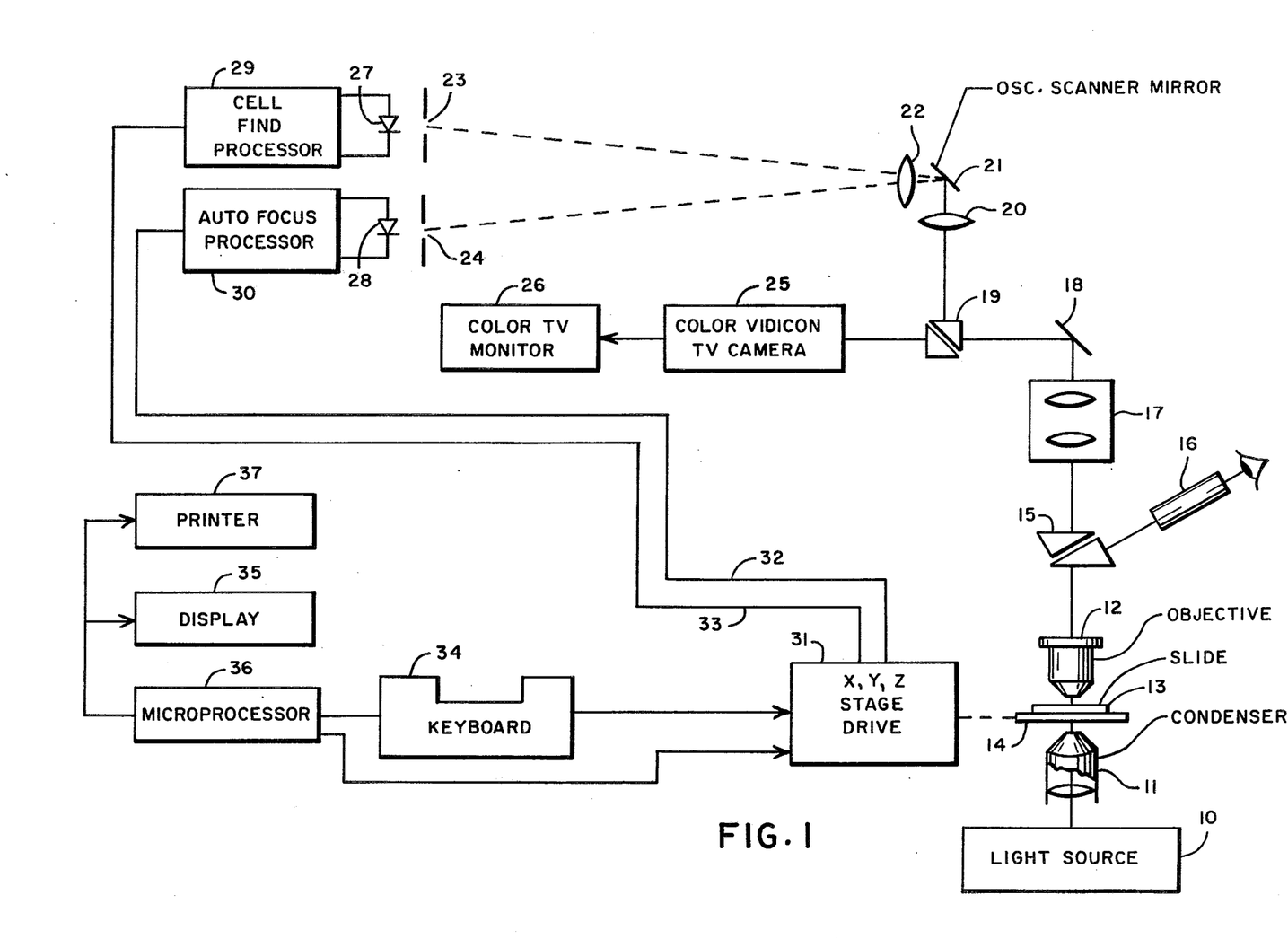
FIG. 1 is a functional block diagram of a scanning automated microscope system utilizing the precise object slide positioning system of the invention.

In the drawings, and, in particular, FIG. 1 thereof, there is disclosed in block form an automated scanning microscope system such as that which may be used to automatically find and focus on white blood cells (leukocytes) as for a leukocyte differential count. The system represents one in which the object slide positioning system of the present invention has been successfully used. Thus, there is provided a light source 10, a conventional condenser lens 11, an objective lens 12 with an objective specimen slide 13 mounted in accordance with the present invention on movable microscope stage 14. A beam splitter is illustrated at 15 associated with viewing eyepiece 16 and imaging lens assembly 17. The remainder of the optical system may include a mirror 18, a second beam splitter 19, additional lens 20, optical scanner 21, which may be an oscillating mirror, a further focussing lens 22, through which the scanner scans to direct light through the lens 22 to apertures 23 and 24.

The automated system which detects and utilizes the optical data to further control the microscope system may include a color vidicon TV camera 25 which together with a monitor 26 may provide a real time presentation of the field of view on the specimen slide 13 to an observer. In one successful embodiment the TV camera utilized is a Toshiba Model 1K-12, and the TV monitor is a Sony Model KV-5000 which are available from the named manufacturers. Automated cell find and focus systems may also be provided including detectors which may be photo diodes 27 and 28 associated with cell find and auto focus signal processors 29 and 30, respectively. The processing units 29 and 30 are utilized to control an autoimtic mechanical stage drive as at 31 through conduits 32 and 33. If desired, a single photo diode may be substituted for the two diodes 27 and 28 and utilized as the light responsive means for both the cell find and auto focus operations. Control of the entire operation may be achieved by the medical technologist or other observer through a key board 34 which operates in conjunction with a display 25. A printer 37 may be provided to present a printout of the relevant data such as that associated with a leukocyte differential count.

The automated operations are controlled by a programmed microprocessor 36 which evaluates the input data from relevant sources and determines the automated operation sequent therefrom. In the same successful embodiment described, the microprocessor included a conventional Central Processor Unit (CPU) which was a Model Intel 8008-1, sold by Intel Corporation. The 8008-1 is a single chip MOS 8-bit parallel CPU. This 8008-1is described in the Intel Corporation literature such as "Intel MCS-8 User's Manual, Nov., 1974". The four basic functional blocks of the 8008-1 processor are an instruction register, memory, arithmetic-logic unit and I/O buffers. It includes six 8-bit data registers, an 8-bit accumulator, two 8-bit temporary registers, four flag bits, and an 8-bit parallel binary arithmetic unit which implements addition, subtraction, and logical operations. A memory stack containing a 14-bit program counter and seven 14-bit words is used internally to store program and subroutine addresses. The 14-bit address permits the direct addressing of 16K words of memory. More detailed explanation of and instructions for the 8008-1 may be found in the manual listed above.

Briefly, the operation of the system is basically as follows. Light emanating from the source 10 traverses the condenser lens 11, the specimen slide 13 and objective lens 12 to the beam splitter 15 where a small portion thereof is reflected by the beam splitter system 15 to the eyepiece 16 and a larger portion continues substantially undeviated through imaging lens assembly 17, is reflected by mirror 18 to the second beam splitter 19 at which point approximately half of the remaining light continues to the vidicon camera 25 which produces a color TV picture on the monitor 26. The other half of the beam is reflected by the beam splitter 19 through lens 20 to oscillating-scanner mirror 21, which may be an oscillating galvanometer mirror, which provides a continuously recurring scan across the optical field of view to light responsive diodes 27 and 28 through apertures 23 and 24, respectively. The electrical output of photo diode 27 is passed on to cell find processor 29, the output of which is connected through 33 to the $x$—$y$ portion of the stage drive 31 which causes the stage to stop and center a cell on the optical axis when such has been detected. The electrical signal from the auto focus diode 28 is utilized by the auto focus processor 30 to actuate the $z$ axis of the stage drive 31 to bring the cell, which has been detected and centered, into proper focus. This operation is normally sequential with the auto focus system inhibited during the cell find operation.

The above-mentioned microprocessor 36 is used in a conventional fashion to store $x$—$y$ coordinate addresses which represent a precise stage location of interest observed during a differential count or other procedure by the operator. Thus, if the operator notes an unusual situation or other item of interest which he later wants to call to the attention of the pathologist or other appropriate person at a later time, he may simply note down the $x$ and $y$ coordinates of the desired location for the stage. At a later time, when the same $x$ and $y$ coordinates are read into the system, these coordinates may be used to issue a signal causing the microscope stage to be driven to the location of the given pair of coordinates in a repeatable fashion. The stage position and drive stage described generally here is described in greater detail in the above cross-referenced, co-pending application of Masterson.

The total system generally presented in FIG. 1 is one in which the slide positioning system of the present invention has been successfully used but the other details of which do not form a part of the present invention and therefore have been described only generally. A more detailed description of the remainder of the system may be found in the above-referenced co-pending application of Adkisson, et al.

Figure 2:
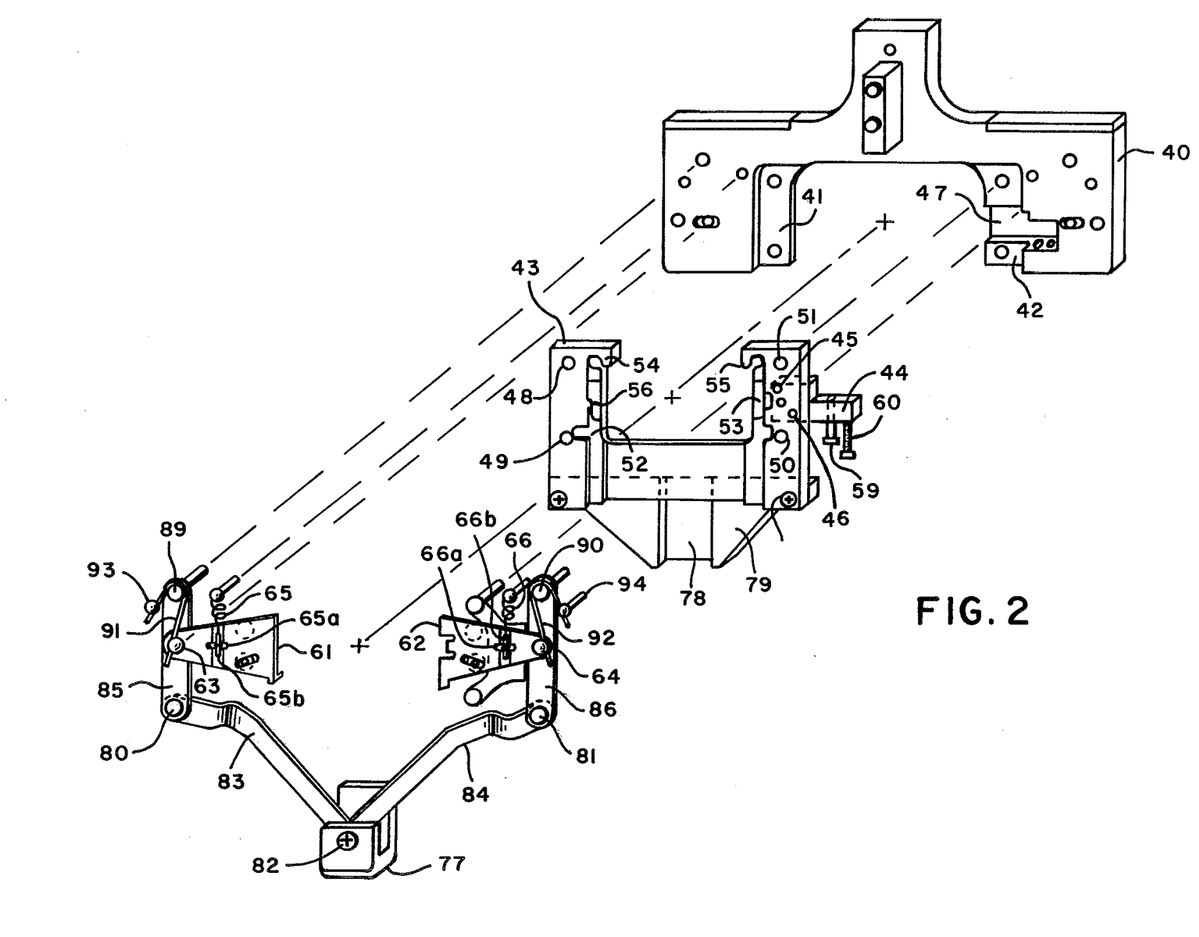
FIG. 2 is an exploded view of the object slide positioning system of the invention.

FIG. 2 is an exploded view which shows generally the assembly of the precise object slide positioning system of the invention. This will be described in conjunction with the plan view of FIG. 3 and partial sectional view of FIG. 4. Thus, there is shown generally at 40 a microscope stage traverse plate which is provided with recesses 41 and 42 which are adapted to receive a slide tray 43 such that adjusting block member 44 which is securely fastened to the slide tray 43 as by fasteners at 45 and 46 is received in the corresponding area 47 of the recess 42.

When assembled the slide tray 43 is fixed to the traverse plate 40 as by conventional threaded fasteners which may be positioning screws 48, 49, 50 and 51. Grooves 52 and 53 are provided in the slide tray 43 to receive the ends of a conventional microscope object slide 53A. Positive stops or guides 54, 55 and 56, which are integral with slide tray 43 are provided as alignment registration members to control the positioning of a slide. These three alignment registration members are raised above the level of the grooves 52 and 53 to provide positive stops for two of the slide edges.

Figures 3, 4:
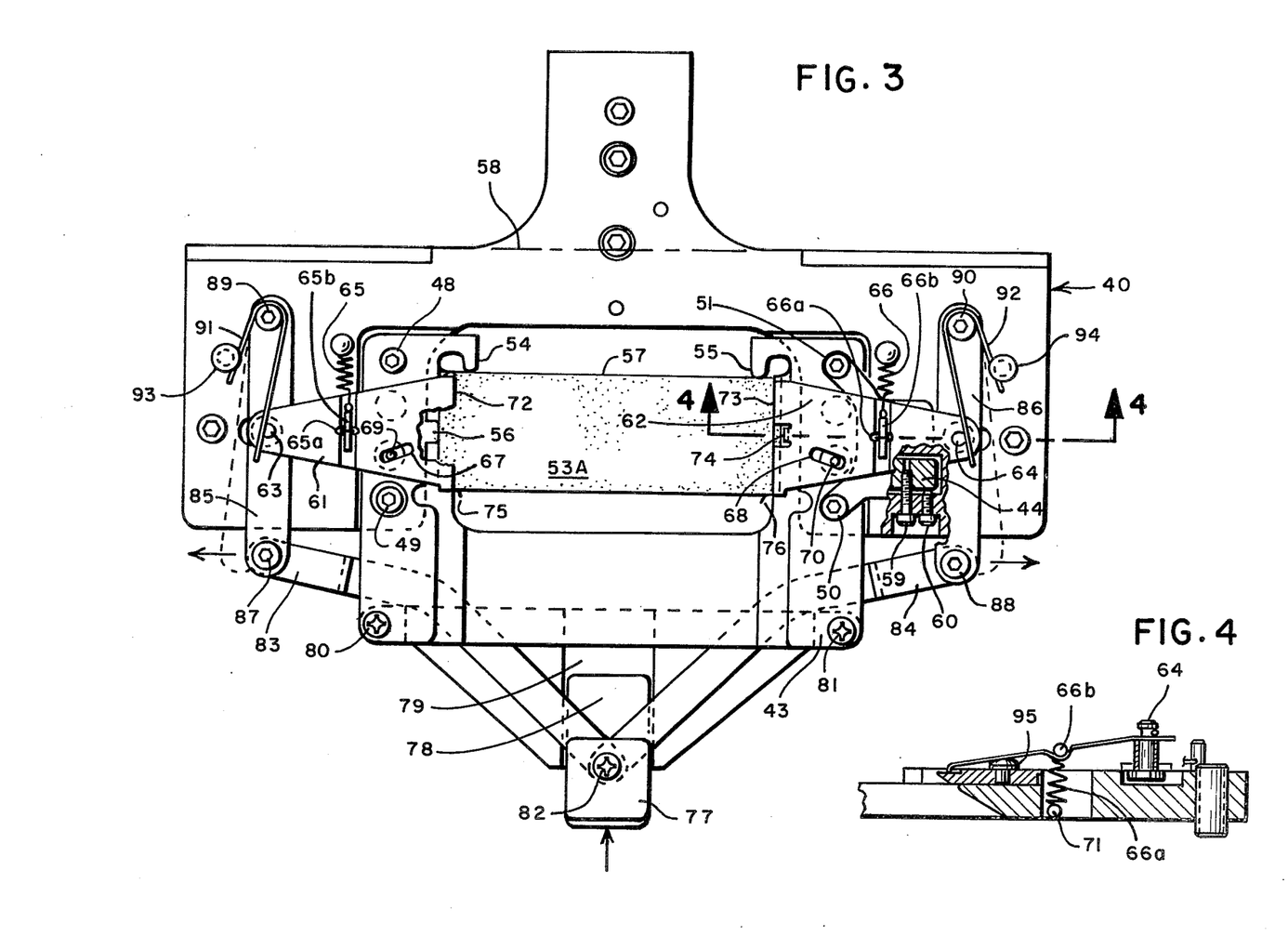
FIG. 3 is a plan view of the assembled system of FIG. 2 with parts cut away.
FIG. 4 is a partial sectional view along lines 4—4 of FIG. 3.

The members 40 and 43 are retained in fixed parallel relation as shown in FIG. 3. The alignment member 44, rigidly fixed to slide tray 43, is utilized in conjunction with the traverse plate 40 to provide precise adjustable parallelism between a line 57 which is defined as a line joining the contact point of the guides 54 and 55 and a line 58 which represents the edge of the stage traverse plate 40, and thus, represents the axial alignment of the stage traverse plate 40. As shown in the cut-away portion of FIG. 3, a conventional pulling screw 59 and pushing screw 60 operating relative to a portion of the traverse plate 40 are provided to precisely adjust the position of the member 44. The alignment is accomplished by slightly loosening fastener 48 and loosening fasteners 49, 50 and 51 such that the slide tray may be pivoted about the fastener screw 48. Thus, by adjusting the screws 59 and 60, a precise alignment between the slide tray 43 and traverse plate 40 may be achieved and the fasteners 48, 49, 50 and 51 tightened to secure the slide tray 43 in the properly aligned position.

In order to accomplish great precision in the alignment of the slide tray 43 with the traverse plate 40, the magnification of the microscope itself is normally used. Thus, an alignment slide (not shown) is used which has a line scribed thereon parallel to one edge of the slide which, when inserted in the slide positioner, is adjacent to the guides 54 and 55. By aligning the scribed line in the ocular field of view of the microscope toward one end thereof and thereafter causing the stage to traverse toward the other end thereof, the screws 59 and 60 may be adjusted such that the line remains in the center of the field of view along its length.

The retractable clamping means of the present invention is shown in the clamped position in FIG. 3 and includes slide retainers 61 and 62 which are pivotally mounted parallel to the plane of the slide tray 43 as by slide retainer pivot pins 63 and 64, respectively. Slide retainers 61 and 62 are urged toward the alignment registration members 54 and 55 as by resilient slide retainer spring members 65 and 66, respectively. The pivotal motion of the slide retainers 61 and 62 in opposition to the springs 65 and 66 is controlled by cams 67 and 68 and associated followers 69 and 70, respectively.

Slide retainers 61 and 62 are simultaneously urged downward toward the slide tray 43 below by anchor springs 65a and 66a which pull inwardly between corresponding upper anchor pins 65b and 66b retained by lower pins, one of which is shown at 71 and FIG. 4. These cooperate to urge edges 72 and 73 of the respective slide retainer 61 and 62 in a downward direction against the slide 53a to hold it against the slide tray 43.

A recessed tab 74 is provided in the edge 73 opposite the positioning guide 56. The tab 74 projects below the edge 73 and to the right of it such that, in the clamped position, the tab 74 urges the corresponding edge of the slide 53a against the alignment registration member 56. Additional tabs 75 and 76 are provided on respective slide retainers 61 and 62 which also protrude below the level of the edges 72 and 73. In the clamped position the tabs 75 and 76 operate to urge the slide 53a against the alignment registration members 54 and 55.

The slide retainer system is operated by a simple push-pull mechanism which includes a finger operated pusher mechanism or actuator knob 77 which is slidably received in a groove 78 in a support lever member 79 which, in turn, is fixed to the slide tray 43 as at 80 and 81. Pivotally attached to the actuator knob 77 as at 82 are a pair of lever actuators 83 and 84, which, in turn, are pivotally attached to a pair of slide retainer lever actuator clamps 85 and 86 as at pivotal connections 87 and 88, respectively. The slide retainer lever actuator clamps 85 and 86 are also pivotally fastened to the slide retainer pivot pins 63 and 64 and pivotally attached to the traverse plate 40 at 89 and 90. Clamps 85 and 86 are normally maintained in the clamped position, i.e., with the pair of slide retainers inwardly directed in the slide retaining position by a pair of torsion springs 91 and 92 which operate to create a force between spring pins 93 and 94 and slide retainer pivot pins 63 and 64 to urge clamps 85 and 86 inward toward the slide 53a.

As is readily discernable from an inspection of the mechanical system of the slide clamping mechanism of the invention, when the actuator knob 77 is pushed inward toward the slide tray 43, the pair of slide retainers 61 and 62 are pivotally spread apart in the direction determined by cams 67 and 68. This releases the slide from alignment registration members 54, 55 and 56. The pivotal motion also enables the slide to clear the tabs 75 and 76. In addition, slide retainer guide members as at 95 (FIG. 4) are provided to lift the edges 72 and 73 upward off of the slide as they are simultaneously pivotally retracted. The slide is now freely removable from the clamping mechanism. When the actuator knob 77 is subsequently released, the torsion springs 91 and 92 return the clamping mechanism to the clamped position.

The precise adjustable parallelism of the fixed alignment registration members or guides 54, 55 and 56 in relation to the traverse plate 40 in cooperation with the alignment registration tab members 74, 75 and 76 assures a positive positioning of the microscope slide in relation to the x and y axes which define a plane parallel to the plane of the traverse plate 40 and slide tray 43. This positively prevents any skewing of the slide or any discrepancy in repeatability in aligning the same slide precisely as it previously was and after subsequent removal and replacement on the slide tray 43.

In addition, the overlap of the inward edges 72 and 73 of the slide retainers 61 and 62 simultaneously retain the slide against the bottom of the recesses or grooves 52 and 53 in the slide tray 43.

Thus, by means of the positive slide positioning system of the present invention the slide is positively clamped in the slide tray 43 during its observation such that it is not free to move in any direction.

Figure 5A:
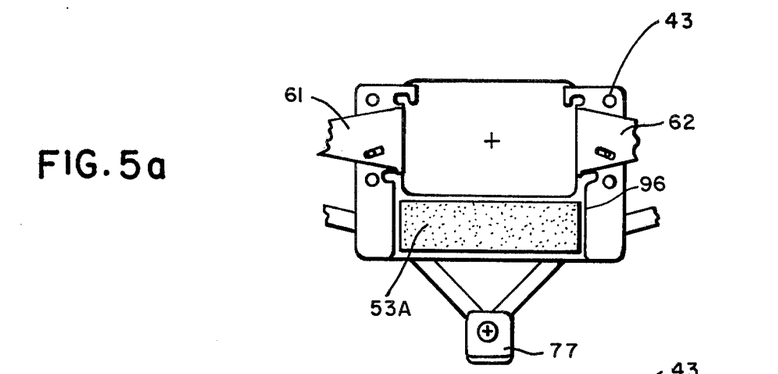
FIGS. 5a–5c represent illustrations of the typical operation of the slide positioning system of the invention.
Figure 5B:
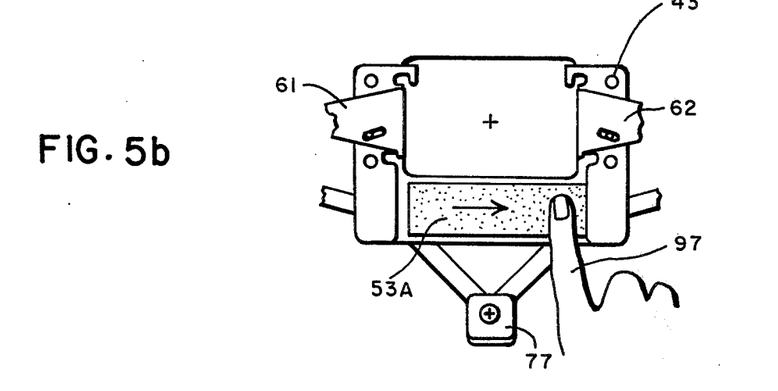
Figure 5C:
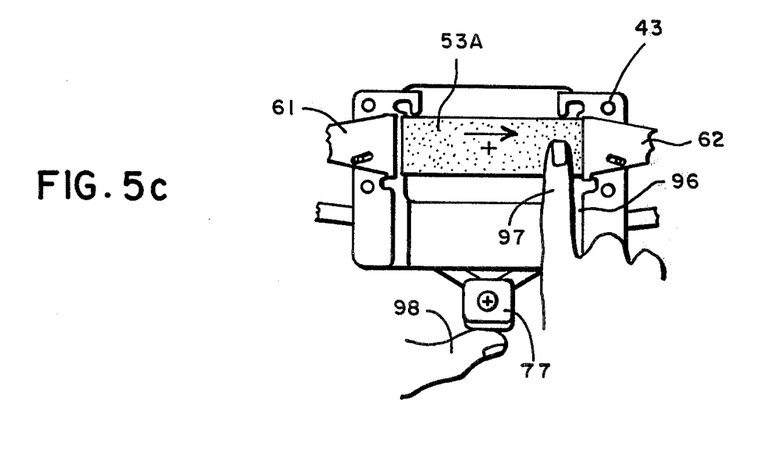

FIGS. 5a, 5b and 5c show the preferred mode of operation of the precision slide positioning system of the invention. Thus, in FIG. 5a the system is shown generally in the clamped position in which a slide 53a has been placed on the loading section of the slide tray 43 and is in position for loading or mounting into the testing position. The mounting is done utilizing guide ridge 96 which forms the outer edge defining the recess 53.

To insert or mount the slide, the operator places his right index finger, as at 97, on the object specimen slide 53a which has been placed on the loading section of the slide trays 43. The slide is then moved to the right until it is firmly seated against the right-hand slide ridge 96. The operator then presses the actuator knob 77 with the left thumb as at 98 moving the mechanism to the unclamped position. The operator continues to hold the slide against the right-hand slide ridge 62 and pushes the slide forward until it reaches the alignment registration guides 54 and 55. The actuator knob then can be released and the slide positioning system returns to the clamped position with the slide held firmly in place. To remove the slide the sequence is simply reversed. By holding the slide against the ridge 96, interference from the positioning guide 56 is avoided.

The embodiments of the invention in which an exclusive property or right is claimed are defined as follows:

1. An apparatus for rigidly and precisely positioning an object slide relative to a microscope stage comprising:
   a stage traverse support plate to receive and support a slide carrier tray;
   a slide carrier tray fixed in predetermined relation to said stage traverse plate and carried thereby, said carrier tray having a recess therein for receiving an object slide;
   predetermined, fixed alignment registration means on said slide carrier tray for determining the positive alignment of a slide in said recess, said alignment registration means determining the location of the rearward directed side and one end of said slide in said recess;
   retractable clamping means cooperating with said alignment registration means for urging and maintaining said slide against said alignment registration means, said slide clamping means further comprising:
      a pair of oppositely disposed retaining means adapted to position said slide operating on the outward directed side and the ends of said slide to urge said slide to a predetermined position against said registration means and said recess;
      means generating a force for maintaining said retaining means against said slide; and
      release means for operating on said retaining means said release means for generating forces simultaneously opposing said force for maintaining each of said retaining means said release means functioning to retract said retaining means for removing and inserting slides in said system.

2. The apparatus of claim 1 wherein said fixed alignment registration means comprises three alignment points integral with said carrier tray disposed such that two of said alignment points are adapted to abut the rearward directed side of said slide, towards the ends thereof and the third alignment point is adapted to abut one end of said slide, and wherein said pair of oppositely disposed retaining means further comprise tab members operating on the sides of said slide opposite said alignment points such that said tab members operate to urge said slide against said alignment points when said retractable clamping means are retained in the clamping position.

3. The apparatus of claim 1 wherein said slide carrier tray further comprises alignment means fixed to said carrier tray for aligning said slide carrier tray relative to said stage traverse plate.

4. The apparatus of claim 3 wherein said means for aligning said carrier tray relative to said traverse plate comprises:
   adjustable positioning screws for fixing said carrier tray on said traverse plate,
   an adjusting block member fixed on said tray; a similarly shaped recess in said traverse plate disposed to receive said adjusting block member number;
   push and pull alignment screws operating through said traverse plate to adjust the position of said adjusting member in said recess thereby adjusting the alignment of said carrier tray by pivoting the said tray about one of said positioning screws.

5. The apparatus of claim 1 wherein said oppositely disposed retaining means include edges, at least in part, disposed to overlap the opposite ends of said slide and maintain said slide downward against said slide carrier tray.

6. The apparatus of claim 1 wherein said means generating said force for maintaining said retaining means against said slide further comprises a resiliently retained mechanism including a first pair of pivotally mounted lever actuators adapted to operate in unison through an actuator knob on a second pair of pivotally mounted actuators flanking said oppositely disposed retaining means, each of which has one end pivotally mounted to said traverse plate and is pivotally mounted to one of said first pair of lever actuators at the other end thereof, and wherein each of said pair of oppositely disposed retaining means is pivotally mounted to a corresponding one of said pair of lever means such that when said first pair of lever actuator means are operated in unison by an inward directed force on said actuator knob, said pair of oppositely disposed retaining means are spread away from the ends of said slide.

7. The apparatus of claim 6 further comprising resilient means for urging each of said second pair of pivotally mounted levers inward toward said slide which operate to return said oppositely disposed retaining means to the inward position upon release of said actuator knob.

8. The apparatus of claim 7 further comprising additional resilient means for urging each of said oppositely disposed retaining means perpendicular to the ends of said slide in the plane of said slide and toward the two of said registration means which are disposed to abut the rearward directed side of said slide toward the ends thereof and third resilient means associated with each of said oppositely disposed retaining means urging said retaining means down toward the plane of the recess of said slide tray.

9. The apparatus of claim 8 further comprising a cam opening in each of same retaining means and follower means associated with said cam opening to define the pivotal path of said retaining means such that all of said tab means are pulled clear of said slide when said clamping means is retracted.

10. The apparatus of claim 8 further comprising a guide member opposing said resilient means holding each of said retaining means down toward the plane of the recess of said slide tray, said guide means being adapted to raise said inward directed end of each of said retaining means above the level of said slide when said retaining means is retracted.

* * * * *

UNITED STATES PATENT OFFICE
CERTIFICATE OF CORRECTION

PATENT NO. : 4,012,111
DATED : March 15, 1977
INVENTOR(S) : EARL E. MASTERSON

It is certified that error appears in the above-identified patent and that said Letters Patent are hereby corrected as shown below:

In Column 8, line 23, delete "number".

Signed and Sealed this

Seventh Day of June 1977

[SEAL]

Attest:

RUTH C. MASON
Attesting Officer

C. MARSHALL DANN
Commissioner of Patents and Trademarks